United States Patent
Ruggiero et al.

(10) Patent No.: US 9,904,917 B2
(45) Date of Patent: Feb. 27, 2018

(54) CHARGING KIOSK AND MASSAGE CHAIR SYSTEM AND APPARATUS

(71) Applicants: Gregory Ruggiero, Sewell, NJ (US); Richard M. Ruggiero, Sewell, NJ (US)

(72) Inventors: Gregory Ruggiero, Sewell, NJ (US); Richard M. Ruggiero, Sewell, NJ (US)

(73) Assignee: Innovative Vending Solutions, LLC, Clayton, NJ (US)

( * ) Notice: Subject to any disclaimer, the term of this patent is extended or adjusted under 35 U.S.C. 154(b) by 0 days.

(21) Appl. No.: 14/670,375

(22) Filed: Mar. 26, 2015

(65) Prior Publication Data
US 2015/0278786 A1  Oct. 1, 2015

(51) Int. Cl.
| G06Q 20/18 | (2012.01) |
| A61H 15/00 | (2006.01) |
| H04W 4/00 | (2018.01) |
| G06Q 20/20 | (2012.01) |
| G06Q 50/06 | (2012.01) |
| G06Q 20/10 | (2012.01) |
| G06Q 20/32 | (2012.01) |
| H02J 7/02 | (2016.01) |
| H02J 50/12 | (2016.01) |
| G07F 17/00 | (2006.01) |

(Continued)

(52) U.S. Cl.
CPC ........... *G06Q 20/18* (2013.01); *A61H 9/0078* (2013.01); *A61H 15/0078* (2013.01); *G06Q 20/10* (2013.01); *G06Q 20/204* (2013.01); *G06Q 20/3278* (2013.01); *G06Q 50/06* (2013.01); *G07F 17/0021* (2013.01); *H02J 7/0027* (2013.01); *H02J 7/02* (2013.01); *H02J 7/025* (2013.01); *H02J 50/12* (2016.02); *H04W 4/008* (2013.01); *A61H 2201/0149* (2013.01); *A61H 2201/1654* (2013.01); *A61H 2201/1669* (2013.01); *A61H 2201/501* (2013.01); *A61H 2201/502* (2013.01); *A61H 2201/5007* (2013.01); *A61H 2201/5015* (2013.01); *A61H 2201/5035* (2013.01); *A61H 2201/5043* (2013.01); *A61H 2201/5046* (2013.01); *A61H 2201/5061* (2013.01); *A61H 2205/081* (2013.01); *A61H 2205/106* (2013.01); *H02J 7/0052* (2013.01); *H02J 2007/0062* (2013.01)

(58) Field of Classification Search
USPC ........................................................ 705/28
See application file for complete search history.

(56) References Cited

U.S. PATENT DOCUMENTS

| 2009/0001775 A1* | 1/2009 | Smith | A47B 83/02 |
| | | | 297/135 |
| 2013/0134781 A1* | 5/2013 | Kang | G06Q 10/06 |
| | | | 307/31 |

* cited by examiner

*Primary Examiner* — Garcia Ade
(74) *Attorney, Agent, or Firm* — Fox Rothschild LLP; Carol E. Thorstad-Forsyth

(57) ABSTRACT

The Massage Chair System and Apparatus with Charging Kiosk includes elements for a massage chair comprised of massage system, a vending system, a charging system, and other advantageous components.

The Massage Chair System and Apparatus with Charging Kiosk provide the ability to charge devices during the time a user enjoys a massage in the chair. The System and Apparatus with Kiosk has components including a timer; a power supply; and a kiosk that can attach to a chair or standalone. Once a person inserts money into the massage chair, the kiosk intercepts the amount inserted and turns on the power to the kiosk supplying power to USB ports and inductive charging pads, allowing a user to charge electronic devices.

8 Claims, 3 Drawing Sheets

(51) Int. Cl.
   *H02J 7/00* (2006.01)
   *A61H 9/00* (2006.01)
   *A47B 83/02* (2006.01)

CHARGING KIOSK AND MASSAGE CHAIR SYSTEM AND APPARATUS

This non-provisional utility patent application claims the benefit of U.S. Provisional Patent No. 61/970,732, titled Massage Chair System and Apparatus with Charging Kiosk.

BACKGROUND

The present invention is related to the vending machine industry, and the kiosk used in connection with the massage chair invention can apply to any industry that wants to provide a complimentary charging service for the duration of some other paid service.

In the art of residential massage chair industry, automated massage chairs may contain internal electronic motors and gears designed to massage the person sitting in them. Some automated massage chairs have some form of controller to vary the type, location, or intensity of massage.

SUMMARY

Embodiments of this invention allow users to quickly convert a vending-operated piece of equipment to allow the ability to provide a device charging service. This is accomplished by reading the same signals supplied by the money delivery device which is collected by an accumulator. The accumulator then passes the information to a timer. The timer can be set to run for the same length of time as the money operated equipment or can be set to more or less time depending on the application, and user and manufacturer preferences. In one embodiment, the timer then activates a 5V power supply sufficient enough to provide power to at least 4 separate 2.1A USB ports. In one embodiment, 5V USB ports are located in a kiosk that can bolt to the piece of equipment or to the ground as a standalone.

Goals of the present invention include but are not limited to offering massage chair systems as providing a service where vending machines are not permitted or used; and to entice consumers to use the chair systems longer.

DETAILED DESCRIPTION

This kiosk invention allows a user to quickly convert any vending-machine-operated piece of equipment (including through coin-operated, credit-card operated, and bill-operated validators, or combinations thereof) to provide an efficient electric device charging service.

Figure 1:
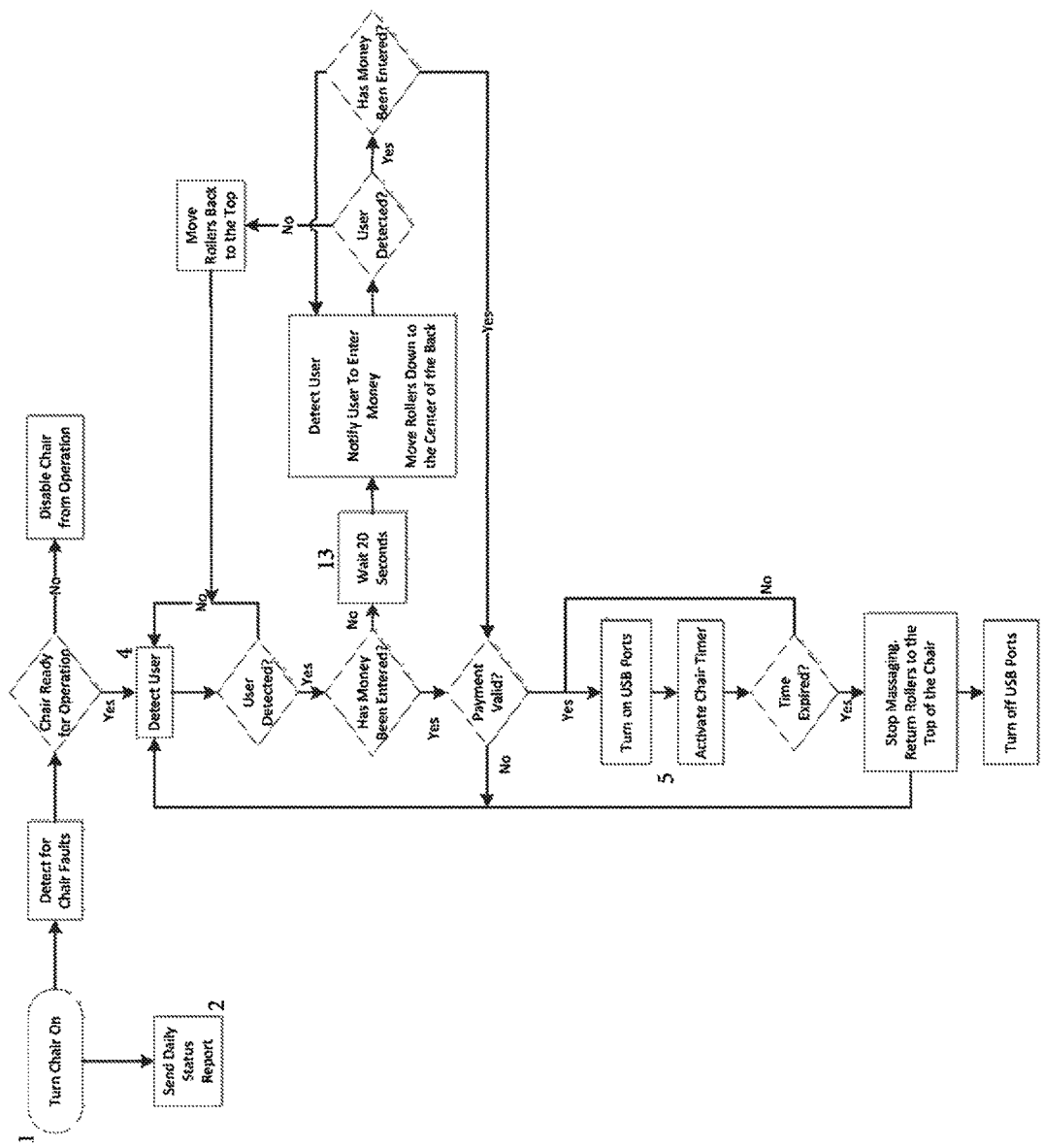
FIG. 1 is a flow diagram for an embodiment of the invention.
Figure 3:
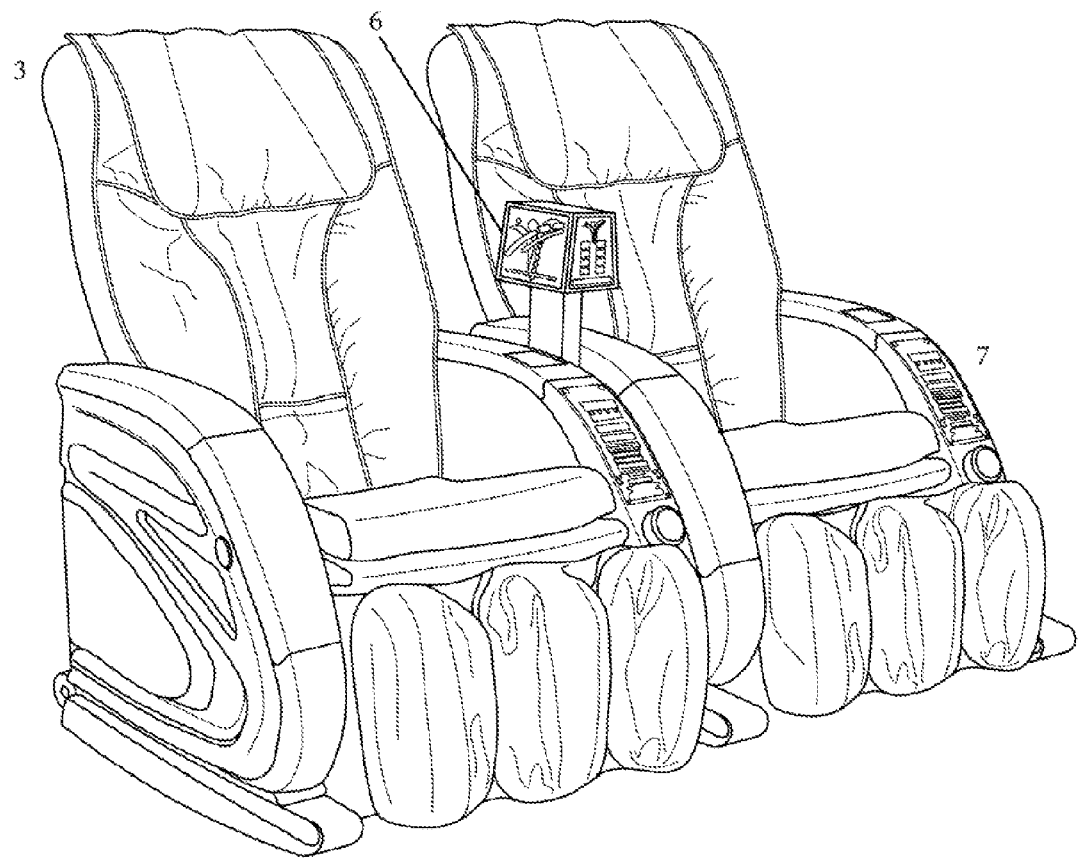
FIG. 3 is an embodiment of a portion of a modular system of a massage chair with a bill validator, and a charging kiosk between two chairs, with recharging capabilities for electronic devices in the kiosk.

As depicted in FIG. 1, once a chair system (modular components of which are shown in FIG. 3) is placed and enabled for power (1), embodiments of the system provide daily status reports (2). Faults may be reported to a headquarters unit for monitoring maintenance and repair needs. When a chair is ready for operation (3), a detecting-user process is activated, and the chair waits for a system user (4).

In further reference to FIG. 1, with valid payment entered, the underlying system is activated (5) to power on, for example, a chair, and charging devices, for example USB ports (6) or, as one alternative, inductive charging pads for other hand-held systems such as smart phones, hand-held video games systems, electronic planners, or other mobile devices. (FIG. 1.)

Embodiments of the kiosk invention itself allow operators to quickly convert any vending-machine-operated piece of equipment to allow the ability to connect a device charging service. Embodiments may also include a kiosk combined with a wireless communication technology for interfacing a mobile device with a massage chair through, for example, wi-fi connectivity, infrared, or Bluetooth means, or with another system's underlying service or product. This connection is accomplished by reading signals supplied by the validator device (7), as those signals are collected by an accumulator. In embodiments of the invention, user-specific signals may be collected into the accumulator by a touch screen, or by a software application connected from a user's device, to the underlying system, for individualized service. An individualized reward system service may be provided through this technology, as well.

Embodiments of the invention incorporate modularity by design: the underlying system, for example one massage chair system with kiosk, may be replaced with another modular system by removing a cable that attaches to a circuit board that comes with, for example, a chair system, and installing a new cable that is then connected to a novel printed circuit board (PCB) that includes an accumulator. A user of an embodiment of the system and apparatus may attach a different cable onto a new PCB and reconnect it into a PCB that comes with chair.

Embodiments of the invention allow the PCB to be designed to allow a single chair to operate two separate kiosks, or to operate a third set of USB ports, or more ports. The PCB may also be designed to supply constant voltage for other purposes, e.g. powering LEDs for a display, or providing an electronic advertisement on a display, which electronic space may be sold to retailers.

Figure 2:
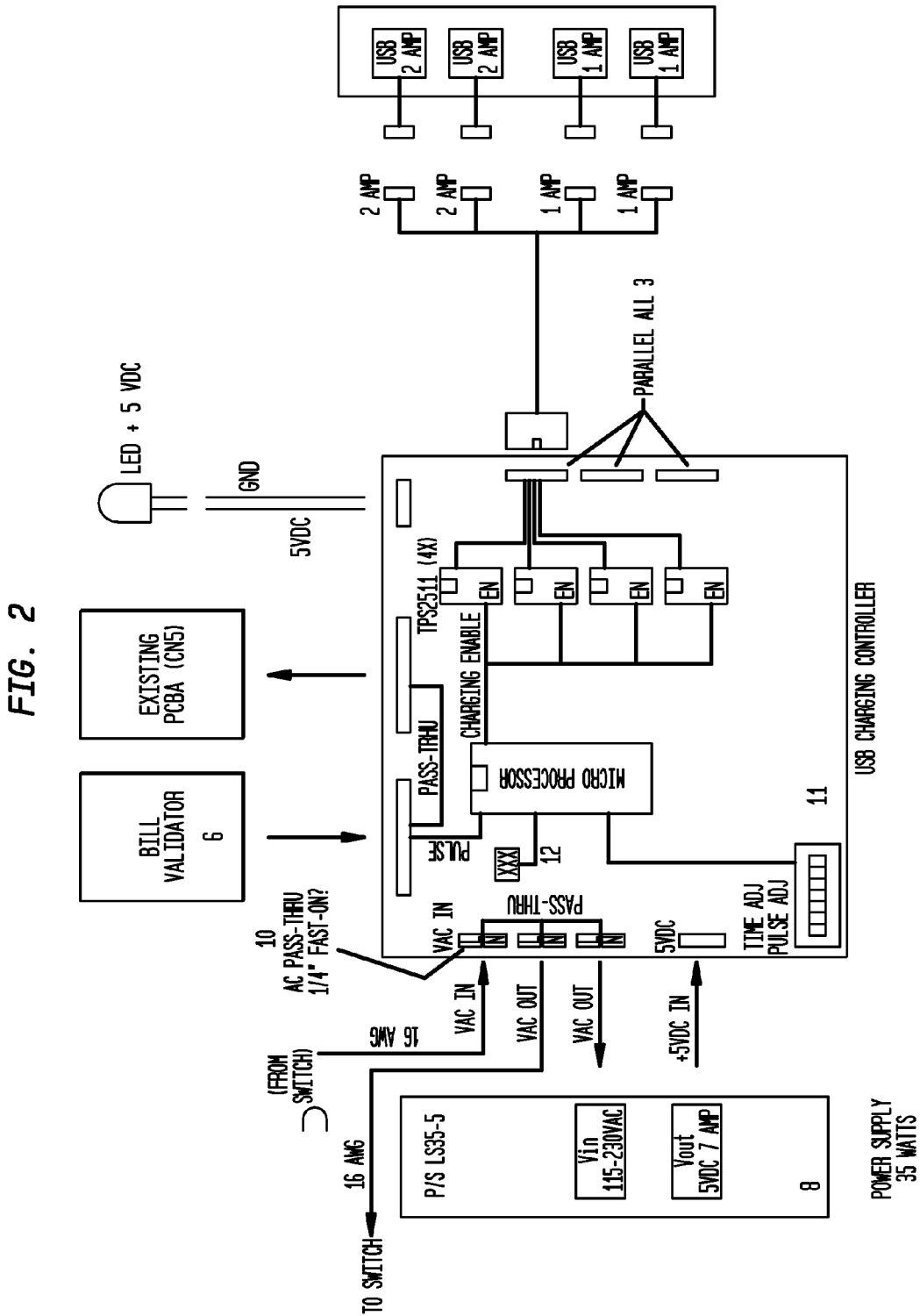
FIG. 2 is a block diagram of an embodiment of the system.

In reference to FIG. 2, once power is engaged, an accumulator then passes the information to a timer. The power input (8) may be 115-230 Volts AC in, and 5V DC and 2.1 Amps out, to enter a charging controller device. The charging controller device may be intended for a USB charger, an inductive pad charger, or a similar charging device. Included in the charger controlling device is a microprocessor (9) following a decision tree similar to the embodiment illustrated in FIG. 1. The microprocessor (9) will receive inputs from a validator (6), will allow for electric power pass through (10), will include either an electronic or manually-determined time and pulse adjustment device (11), which may further include mechanical resonance of a vibrating crystal (12) to create a predetermined frequency to monitor time. An embodiment of the invention incorporates an oscillating crystal at about 10 MHz.

The timer may be set to run for the same length of time as the coin operated equipment or can be set to more or less time depending on the application. The timer's purpose is to determine how much time a, for example, 5V power supply is powered on and engaged for a user.

The 5V power supply may be sufficient to provide power to multiple USB ports, charging pads, or the like. For example, in one embodiment of the invention, the invention is used to provide power to 4 separate USB ports at 2.1A.

In that embodiment, cabling may be designed to run from the new PCB to the kiosk. The cabling design includes the ability to easily remove each USB port individually for maintenance purposes.

The 5V USB ports are located in a kiosk that can bolt to the piece of equipment or standalone. The charging kiosk can operate as a totally standalone unit by simply adding a device to collect money.

In additional embodiments, the massage chair system may be designed to be 20 mm higher than other chairs to better allow for running wires safely under them.

Embodiments of the invention will have electricity flowing through the system without engaging components used for USB outlet charging or for the massage system. Because electricity will pass through the system (10), to engage, for example, light emitting diode (LED) lights on an acrylic on a pedestal, or a coin, bill, or credit card validator (6), which will be activated without engaging the massage chair elements for power.

Optionally, embodiments of the kiosk invention may include a channel between chairs for running wires. This allows running wires neatly and safely without wires being exposed or running under carpets. In an embodiment of the invention, optionally, a power supply design allows constant supply of power to LEDs, but has circuitry to only allow power to USBs when the chair is massaging.

Optionally, embodiments of the power supply design may allow for the ability to program different scenarios, for example, allowing extra USB charging if a user enters a certain amount of money. Such direction may be ordered through a touch screen, money validator, or a user's mobile device, as examples.

Optionally, in an embodiment of the invention, the power supply is designed to allow multiple charging stations to attach to it allowing greater flexibility in chair configurations.

Optionally, in an embodiment of the invention, the charging station is designed for attachment of a touch screen display, which may be designed for left and right hand implementation.

A touch screen is designed to give users total control of the massage, including:
 a. Allowing a user to turn off completely, slow down, or speed up any of, for example, three massaging motors;
 b. Allowing a user to turn off, for example, optional two seat air bladders; and/or
 c. Allowing users to turn off an optional calf air bladder.

An embodiment of the apparatus and system includes a software application which allows a user to control everything the touch screen would control, and in addition it may remember a user's preferences so the user does not have to configure the chair every time the user engages the massage chair system. Recalling user preference, for example for travelers at distant airports, is further service by a smart phone application that remembers a user's preferences from one service, so the user does not need to configure the chair every time the user engages the chair.

Embodiments of the invention include programming and sensors which allow for movement of rollers or other such devices to move down in the middle of a chair (3), to create discomfort at a user's back after, for example, about twenty seconds (13), if a user sits in the massage chair and does not put money in the vending portion of the machine. The effect of this optional embodiment is to make a user uncomfortable so the user does not linger in the chair without putting money in, and allows for more efficient marketing of the chair system for paying users. The program can be changed at any time if a situation warrants, for example, by extending a timer, by reducing intensity of a vibrating irritation means, or the like. In addition to rollers, knobs, irregularly positioned nodules, or large, rounded pins, for example, may be used to make the system uncomfortable for sitting, so the user does not linger in the chair without putting money in, and thereby freeing up the chair for a subsequent paying user. Embodiments of the system allow for changes to the timing requirement and intensity of the discomforting means.

Optionally, embodiments of the massage chair include installation of, for example, four rivnuts, to allow bolting the chairs together with a charging kiosk or by just installing a plain wire channel. This may be mimicked by an embodiment of the kiosk base.

Embodiments of all systems will allow for enhancements on all new or existing chairs. Embodiments of the systems allow for in filed retrofits which can be accomplished with little to no tools. The charging technology is portable to any vending unit. A vendor or user could attach the kiosk to anything that accepts money, not just a massage chair.

Among other embodiments, the system may be designed to be 20 mm higher than other chairs to better allow for running wires safely under them. Regarding efficient spacing, a kiosk may create a channel between chairs for running wires, allowing neat and safe wire bundling without exposing or running wires under carpets at malls, airports, or other heavily trafficked areas.

As noted in FIG. 2, embodiments contain power supply designs that provide a constant supply of power to LEDs, with circuitry to only allow power to USBs when the chair is massaging. These designs allows for the ability to program different scenarios such as extra power charging if a user enters a certain amount of money.

An additional benefit of the power supply is allowing multiple charging stations to attach to the power supply, allowing greater flexibility in chair configurations, creating a flexible, modular capacity.

The charging technology is portable to any vending unit. That is, the kiosk may be attached to devices that accept money, not just a massage chair system. Embodiments of the kiosk include connection to at least one seating unit for holding a seated user within reach of a charging receptacle outlet, activation of a seating unit to control the seating unit and electrical outlet for charging electrical devices; a massaging component within the seat, and the system further including a wireless Internet source or a wireless connectivity access point, such as Bluetooth radio, infrared light, use of modern 802.11 standards, or similar connection methods.

Embodiments of the disclosed chair system with kiosk may further incorporate more than one power source, for example at least three power sources, may allow for multiple charging stations to be attached to the at least one power source, and due to modularity by design, commercial profitability is increased to prepare for irregular configurations required from one location to another.

It is a further goal of the invention to provide a method for reducing anxiety or depression in a user by providing a massage service while also increasing responsiveness and situational awareness of a user through maximally-powered mobile devices.

As noted above, the massage system may incorporate three motors and through touch screen or a smart phone application, or through recalled user preferences, a user may turn off completely, slow down, or speed up any of, for example, three motors, two seat air bladders; and/or an optional calf air bladder. During the massaging process the above-noted electronic advertisement on a display may be presented, where electronic space may be sold to retailers.

By providing these services explained above, the chairs not only provide a recharging service that engages new commercial markets that are opposed to vending, but also entice people to stay in the chair longer, thus increasing revenue, and, optionally, market to the consumers through displays, charging mobile devices, and through similar methods based on a user's stationary position during system engagement.

Regarding the circuit board assembly, in embodiments of the system, cabling is designed to run from a new PCB to a kiosk, and includes the ability to easily remove each USB port or charging pad, individually, for maintenance purposes. See FIG. 2, illustrating parallel relationship among USB ports.

While the 5V charging ports are located in a kiosk that can bolt to the piece of equipment or standalone, the charging kiosk can also operate as a totally standalone unit by simply adding a device to collect money.

It is to be understood that the detailed description of illustrative embodiments are provided for illustrative purposes. The scope of the claims is not limited to these specific embodiments or examples. Therefore, various process limitations, elements, details, and uses can differ from those just described, or be expanded on or implemented using technologies not yet commercially viable, and yet still be within the inventive concepts of the present disclosure. The scope of the invention is determined by the following claims and their legal equivalents.

The inventors claim:

1. A seating system, comprising:
   at least one seating unit having a messaging component to mechanically provide a therapeutic manipulation of body tissue and a seat sized and shaped to allow a user to sit thereon so that said body tissue is adjacent to the messaging component;
   a recharger configured to re-charge a power source;
   at least one payment unit configured to receive payment for a massage service provided by the seating unit; and
   a processor programmed to
      initiate a first transition of an operational state of the recharger from a first operational state in which the recharger is disabled to a second operational state in which the recharger is enabled in response to the payment unit's reception of said payment for the message service, and
      initiate a second transition of the operational state of the recharger from the second operational state to the first operational state in response to an expiration of a paid amount of time for the message service;
   wherein the seating system provides a complimentary charging service for recharging the power source of an external electronic device while simultaneously providing the massage service.

2. The seating system of claim 1, further comprising a power control board, and a timing crystal.

3. The seating system of claim 1, further comprising a wireless transceiver configured to wirelessly communicate with an external communications device.

4. The seating system of claim 1, further comprising at least 3 power sources.

5. The seating system of claim 1, further comprising:
   a sensor which detects when the user has been seated on the seat for a time period that is greater than a predetermined amount of time;
   a discomforting mechanism configured to mechanically cause physical discomfort to the user.

6. The seating system of claim 1, further comprising:
   a first user control to control a speed of the massaging component;
   a second user control to control operation of at least one seat air bladder; and
   a third user control to control operation of at least one calf air bladder.

7. The seating system of claim 5, further comprising a power supply attached to at least one other seating system.

8. The seating system of claim 5, further comprising a circuit board assembly comprising:
   access to an accumulator;
   electrical receptacles between a first PCB and at least one additional seating unit;
   access from the circuit board assembly to at least two kiosks and to a set of USB ports;
   access to a supply of constant voltage for powering Light Emitting Diodes ("LEDs") for a display;
   a connection allowing information to be passed from the accumulator to a timer;
   a power source configured to supply power to the seating system for a predetermined time; and
   access to at least two USB ports located in a kiosk.

* * * * *

UNITED STATES PATENT AND TRADEMARK OFFICE
CERTIFICATE OF CORRECTION

PATENT NO.       : 9,904,917 B2
APPLICATION NO.  : 14/670375
DATED            : February 27, 2018
INVENTOR(S)      : Gregory Ruggiero and Richard M. Ruggiero Page 1 of 1

It is certified that error appears in the above-identified patent and that said Letters Patent is hereby corrected as shown below:

In the Claims

Under Column 5 in Claim 1, Line 2 please replace "messaging component" with -- massaging component --

Under Column 5 in Claim 1, Line 6 please replace "messaging component" with -- massaging component --

Under Column 5 in Claim 1, Line 16 please replace "message service" with -- massage service --

Under Column 6 in Claim 1, Line 4 please replace "message service" with -- massage service --

Signed and Sealed this
Twelfth Day of November, 2019

Andrei Iancu
*Director of the United States Patent and Trademark Office*

(12) EX PARTE REEXAMINATION CERTIFICATE (171st)
Ex Parte Reexamination Ordered under 35 U.S.C. 257

United States Patent
Ruggiero et al.

(10) Number: US 9,904,917 C1
(45) Certificate Issued: Jun. 17, 2020

(54) CHARGING KIOSK AND MASSAGE CHAIR SYSTEM AND APPARATUS

(71) Applicants: Gregory Ruggiero, Sewell, NJ (US); Richard M. Ruggiero, Sewell, NJ (US)

(72) Inventors: Gregory Ruggiero, Sewell, NJ (US); Richard M. Ruggiero, Sewell, NJ (US)

(73) Assignee: INNOVATIVE VENDING SOLUTIONS, LLC

Supplemental Examination Request:
No. 96/000,298, Oct. 16, 2019

Reexamination Certificate for:
Patent No.: 9,904,917
Issued: Feb. 27, 2018
Appl. No.: 14/670,375
Filed: Mar. 26, 2015

Certificate of Correction issued Nov. 12, 2019

Related U.S. Application Data

(60) Provisional application No. 61/970,732, filed on Mar. 26, 2014.

(51) Int. Cl.
*G06Q 20/18* (2012.01)
*H02J 50/12* (2016.01)
(Continued)

(52) U.S. Cl.
CPC ........... *G06Q 20/18* (2013.01); *A61H 9/0078* (2013.01); *A61H 15/0078* (2013.01); *G06Q 20/10* (2013.01); *G06Q 20/204* (2013.01); *G06Q 20/3278* (2013.01); *G06Q 50/06* (2013.01); *G07F 17/0021* (2013.01); *H02J 7/0027* (2013.01); *H02J 7/02* (2013.01); *H02J 50/12* (2016.02); *H04W 4/80* (2018.02); *A61H 2201/0149* (2013.01); *A61H 2201/1654* (2013.01); *A61H 2201/1669* (2013.01); *A61H 2201/501* (2013.01); *A61H 2201/502* (2013.01); *A61H 2201/5007* (2013.01); *A61H 2201/5015* (2013.01); *A61H 2201/5035* (2013.01); *A61H 2201/5043* (2013.01);
(Continued)

(58) Field of Classification Search
CPC ...... G06Q 20/18; G06Q 20/204; G06Q 50/06; G06Q 20/10; G06Q 20/3278; H04W 4/80; H02J 7/02; H02J 50/12; H02J 7/0027; H02J 7/00; H02J 7/025; A61H 9/0078; A61H 15/0078; A61H 2201/0149; A61H 2201/1654; A61H 2201/1669; A61H 2201/5007; A61H 2201/501; A61H 2201/5015; A61H 2201/502; A61H 2201/5035; A61H 2201/5043; A61H 2201/5046; A61H 2201/5061; A61H 2205/081; A61H 2205/106; G07F 17/0021
See application file for complete search history.

(56) References Cited

To view the complete listing of prior art documents cited during the supplemental examination proceeding and the resulting reexamination proceeding for Control Number 96/000,298, please refer to the USPTO's public Patent Application Information Retrieval (PAIR) system under the Display References tab.

*Primary Examiner* — Jeffrey D Carlson

(57) ABSTRACT

The Massage Chair System and Apparatus with Charging Kiosk includes elements for a massage chair comprised of massage system, a vending system, a charging system, and other advantageous components.

The Massage Chair System and Apparatus with Charging Kiosk provide the ability to charge devices during the time a user enjoys a massage in the chair. The System and Apparatus with Kiosk has components including a timer; a power supply; and a kiosk that can attach to a chair or standalone. Once a person inserts money into the massage chair, the kiosk intercepts the amount inserted and turns on (Continued)

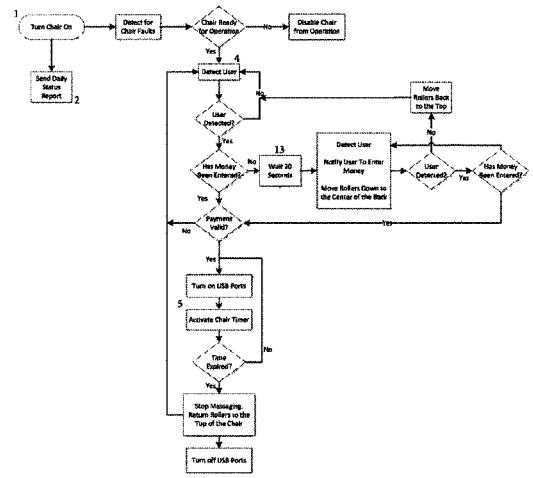

the power to the kiosk supplying power to USB ports and inductive charging pads, allowing a user to charge electronic devices.

(51) Int. Cl.
*G07F 17/00* (2006.01)
*H02J 7/00* (2006.01)
*H02J 7/02* (2016.01)
*A61H 9/00* (2006.01)
*A61H 15/00* (2006.01)
*H04W 4/00* (2018.01)
*G06Q 20/20* (2012.01)
*G06Q 50/06* (2012.01)
*G06Q 20/10* (2012.01)
*G06Q 20/32* (2012.01)
*A47B 83/02* (2006.01)
*H04W 4/80* (2018.01)

(52) U.S. Cl.
CPC ............... *A61H 2201/5046* (2013.01); *A61H 2201/5061* (2013.01); *A61H 2205/081* (2013.01); *A61H 2205/106* (2013.01); *H02J 7/00* (2013.01)

EX PARTE REEXAMINATION CERTIFICATE

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1-4 are cancelled.

Claims 5-8 are determined to be patentable as amended.

5. [The] *A* seating system [of claim 1], [further] comprising:
   *a power supply circuit that provides power to the seating system;*
   *at least one seating unit having a massaging component coupled to the power supply circuit and configured to mechanically provide a therapeutic manipulation of body tissue as part of a massage service when the massaging component is enabled and the at least one seating unit is occupied by a user, and a seat sized and shaped to allow the user to sit thereon so that said body tissue is adjacent to the massaging component when the at least one seating unit is occupied by the user;*
   *a charger configured to provide a complimentary charging service in which charging is facilitated for a power source of an external electronic device that has been connected to the seating system by the user, the power supply circuit configured to supply power to the charger during a period of time that the massage service is provided by the at least one seating unit;*
   *at least one payment unit configured to receive payment for the massage service provided by the seating unit; and*
   *a processor programmed to*
      *initiate a first transition of an operational state of the charger from a first operational state in which the charger is disabled to a second operational state in which the charger is enabled in response to the payment unit's reception of said payment for the massage service, and*
      *initiate a second transition of the operational state of the charger from the second operational state to the first operational state in response to an expiration of a paid amount of time for the massage service;*
   a sensor [which detects] *configured to detect* when the user has been seated on the seat for a time period that is greater than a predetermined amount of time; *and*
   a discomforting mechanism configured to mechanically cause physical discomfort to the user.

6. The seating system of claim [1] *5*, further comprising:
   a first user control to control a speed of the massaging component;
   a second user control to control operation of at least one seat air bladder; and
   a third user control to control operation of at least one calf air bladder.

7. The seating system of claim 5, [further comprising a] *wherein the* power supply *circuit is* attached to at least one other seating system.

8. The seating system of claim 5, further comprising a circuit board assembly comprising:
   access to an accumulator;
   electrical receptacles between a first PCB and at least one additional seating unit;
   access from the circuit board assembly to at least two kiosks and to a set of USB ports;
   access to a supply of constant voltage for powering Light Emitting Diodes ("LEDs") for a display;
   a connection allowing information to be passed from the accumulator to a timer;
   [a power source configured to supply power to the seating system for a predetermined time;] and
   access to at least two USB ports located in a kiosk.

* * * * *

(12) SUPPLEMENTAL EXAMINATION CERTIFICATE

United States Patent
Ruggiero et al.

(10) Number: US 9,904,917 F1
(45) Certificate Issued: Nov. 25, 2019

Control No.: 96/000,299

Filing Date: Oct. 16, 2019

Primary Examiner: Jeffrey D. Carlson

No substantial new question of patentability is raised in the request for supplemental examination. See the Reasons for Substantial New Question of Patentability Determination in the file of this proceeding.

(56) Items of Information

U.S. PATENT DOCUMENTS

| | | |
|---|---|---|
| 2007/0040652 | 2/2007 | Quatro |
| 8,613,385 | 12/2013 | Hulet et al. |
| 2012/0310425 | 12/2012 | Kang |
| 2011/0011930 | 1/2011 | Starr et al. |
| 2013/0030998 | 1/2013 | Colley et al. |
| 2013/0046197 | 2/2013 | Dlugos, Jr. et al. |